United States Patent
Zhu et al.

(10) Patent No.: US 12,408,020 B2
(45) Date of Patent: Sep. 2, 2025

(54) METHOD FOR TRANSMITTING RADIO NODE INFORMATION

(71) Applicant: ZTE CORPORATION, Guangdong (CN)

(72) Inventors: Jinguo Zhu, Shenzhen (CN); He Huang, Shenzhen (CN); Qiang Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 478 days.

(21) Appl. No.: 18/096,230

(22) Filed: Jan. 12, 2023

(65) Prior Publication Data
US 2023/0328508 A1    Oct. 12, 2023

Related U.S. Application Data

(63) Continuation of application No. PCT/CN2020/102361, filed on Jul. 16, 2020.

(51) Int. Cl.
*H04W 8/20* (2009.01)
*H04W 8/26* (2009.01)
*H04W 36/00* (2009.01)
*H04W 40/36* (2009.01)

(52) U.S. Cl.
CPC .............. *H04W 8/20* (2013.01); *H04W 8/26* (2013.01); *H04W 40/36* (2013.01); *H04W 36/0064* (2023.05)

(58) Field of Classification Search
CPC ......... H04W 8/20; H04W 8/26; H04W 40/36; H04W 36/0064; H04W 8/18; H04W 8/08
See application file for complete search history.

(56) References Cited

U.S. PATENT DOCUMENTS

| | | |
|---|---|---|
| 2018/0270778 A1 | 9/2018 | Bharatia |
| 2019/0261260 A1 | 8/2019 | Dao et al. |
| 2020/0053638 A1 | 2/2020 | Edge et al. |
| 2020/0213897 A1 | 7/2020 | Qiao et al. |

FOREIGN PATENT DOCUMENTS

| | | |
|---|---|---|
| EP | 3 826 359 A1 | 5/2021 |
| WO | WO-2018/175974 A1 | 9/2018 |
| WO | WO-2020/015639 A1 | 1/2020 |
| WO | WO-2020/074126 A1 | 4/2020 |
| WO | WO-2020/103662 A1 | 5/2020 |

OTHER PUBLICATIONS

3rd Generation Partnership Project, "Technical Specification Group Services and System Aspects; Procedures for the 5G System (5GS); Stage 2 (Release 16)", 3GPP TS 23.502, V16.5.0, Jul. 9, 2020, Valbonne, France (594 pages).

(Continued)

*Primary Examiner* — Ashley Shivers
(74) *Attorney, Agent, or Firm* — Foley & Lardner LLP

(57) ABSTRACT

A wireless communication method for use in an access and mobility management function is disclosed. The wireless communication method comprises receiving a subscription for radio node information associated with a wireless terminal in a wireless network node, and transmitting, to a network exposure function, the radio node information associated with the wireless terminal in the wireless network node.

16 Claims, 7 Drawing Sheets

Receive a subscription for radio node information associated with a wireless terminal in a wireless network node — 1101

Transmit, to a network exposure function, the radio node information associated with the wireless terminal in the wireless network node — 1102

(56) References Cited

OTHER PUBLICATIONS

Extended European Search Report for EP Appl. No. 20944980.0, dated Jan. 2, 2024 (12 pages).
Ericsson, "Event exposure (NEF and UDM services)" SA WG2 Meeting #122, S2-174361, San Jose Del Cabo, Mexico, Jun. 30, 2017 (10 pages).
International Search Report and Written Opinion for PCT Appl. No. PCT/CN2020/102361, mailed on Apr. 19, 2021 (6 pages).
Qualcomm Incorporated, "Unified Solution for Location Service Exposure" SA WG2 Meeting #128bis, S2-188083, Sophia Antipolis, France, Aug. 24, 2018 (8 pages).
First Office Action for CN Appl. No. 202080104847.8, dated Jun. 20, 2025 (with English translation, 18 pages).

METHOD FOR TRANSMITTING RADIO NODE INFORMATION

This application is a continuation of PCT/CN2020/102361, filed Jul. 16, 2020, the content of which is incorporated herein by reference in its entirety.

TECHNICAL FIELD

This document is directed generally to wireless communications.

BACKGROUND

Multi-access edge computing (MEC) enables running MEC applications at the edge of a network where the environment is characterized by a low latency, a proximity, a high bandwidth and an exposure to location and up-to-date radio access network information.

SUMMARY

The radio access network information of current radio conditions are shared via MEC platforms over a radio network information service (RNIS). The RNIS is a service that provides radio network related information to the MEC applications and to the MEC platforms. Typical information that may be provided via the MEC platforms is listed as follows:
- up-to-date radio access network information regarding to radio network conditions;
- measurement information related to a user plane (e.g. latency);
- information about user equipments (UEs) connected to radio node(s) associated with a MEC host, these UEs' contexts and related radio access bearers;
- changes on information related to the UEs connected to the radio node(s) associated with the MEC host, these UEs' contexts and the related radio access bearers.

The MEC applications and the MEC platform may use the radio access network information to optimize the existing services and to provide a new type of services that are based on up-to-date information of the radio conditions.

However, it is unclear how the RNIS in the MEC receives the radio access network information from a radio access network (RAN) node when the RNIS does not have information about the UE (e.g. a current cell of the UE and/or whether the UE keeps moving). Thus, it is to be discussed how the RNIS retrieves the radio network information from the RAN node.

This document relates to methods, systems, and devices for receiving the radio network information, and more particular to methods, systems, and devices for the RNIS retrieving the radio network information from the RAN node.

The present disclosure relates to a wireless communication method for use in an access and mobility management function. The wireless communication method comprises receiving a subscription for radio node information associated with a wireless terminal in a wireless network node, and transmitting, to a network exposure function, the radio node information associated with the wireless terminal in the wireless network node.

Various embodiments may preferably implement the following features:

Preferably, the radio node information comprises at least one of an address of the wireless network node or a temporary identification of a user equipment context in the wireless network node.

Preferably, the address of the wireless network node refers to a transport network layer association transport address.

Preferably, the temporary identification refers to a radio access network node user equipment next generation application protocol identification.

Preferably, the radio node information is transmitted in at least one of an initial user equipment message, a path switch request message or a handover request acknowledge message.

The present disclosure relates to a wireless communication method for use in a network exposure function. The wireless communication method comprises subscribing, to an access and mobility management function, radio node information associated with a wireless terminal in a wireless network node, and receiving, from the access and mobility management function, the radio node information associated with the wireless terminal in the wireless network node.

Various embodiments may preferably implement the following features:

Preferably, the radio node information comprises at least one of an address of the wireless network node or a temporary identification of a user equipment context in the wireless network node.

Preferably, the address of the wireless network node refers to a transport network layer association transport address.

Preferably, the temporary identification refers to a radio access network node user equipment next generation application protocol identification.

Preferably, the radio node information is received in at least one of an initial user equipment message, a path switch request message or a handover request acknowledge message.

Preferably, the wireless communication method further comprises establishing a transport network layer association towards the wireless network node based on the radio node information.

Preferably, the wireless communication method further comprises transmitting, to the wireless network node, a request for radio network information via the transport network layer association, and receiving, from the wireless network node, the radio network information via the transport network layer association.

Preferably, the request for the radio network information comprises a temporary identification of a user equipment context in the wireless network node.

Preferably, the radio network information comprises at least one of cell information, radio access bearer information, a measurement report, a timing advance measurement report, a carrier aggregation configuration, or an event of the subscription expiring.

Preferably, the radio network information is associated with at least one event of the wireless network node, wherein the at least one event comprises at least one of:
- the wireless network node detecting a cell change,
- the wireless network node detecting at least one of an establishing, a modification or a release of a radio access bearer,
- the wireless network node performing a measurement towards the wireless terminal,
- the wireless network node performing a timing advance measurement towards the wireless terminal, or
- the subscription expiring.

Preferably, the wireless communication method further comprises transmitting, to an application function, the radio network information.

The present disclosure relates to a wireless communication method for use in a session management function. The wireless communication method comprises receiving a subscription associated with a quality of service flow mapping information of a packet data unit session, and transmitting, to a network exposure function, the quality of service flow mapping information. Various embodiments may preferably implement the following feature:

Preferably, the quality of service flow mapping information comprises mapping information between at least one service flow and at least one quality of service flow within the packet data unit session.

The present disclosure relates to a wireless communication method for use in a network exposure function. The wireless communication method comprises subscribing, to a session management function, quality of service flow mapping information of a packet data unit session, and receiving, from the session management function, the quality of service flow mapping information.

Various embodiments may preferably implement the following feature:
Preferably, the quality of service flow mapping information comprises mapping information between at least one service flow and at least one quality of service flow within the packet data unit session.

The present disclosure relates to a wireless device, comprising a communication unit, configured to:
receive a subscription for radio node information associated with a wireless terminal in a wireless network, and
transmit, to a network exposure function, the radio node information associated with the wireless terminal in the wireless network node.

Various embodiments may preferably implement the following feature:
Preferably, the wireless device further comprises a processor configured to perform a wireless communication method of any of the foregoing described methods.

The present disclosure relates to a wireless device, comprising:
a processor, configured to subscribe, to an access and mobility management function, radio node information associated with a wireless terminal in a wireless network node, and
a communication unit, configured to receive, from the access and mobility management function, the radio node information associated with the wireless terminal in the wireless network node.

Various embodiments may preferably implement the following feature:
Preferably, the processor is further configured to perform a wireless communication method of any of the foregoing described methods.

The present disclosure relates to a wireless device, comprising a communication unit, configured to:
receive a subscription associated with a quality of service flow mapping information of a packet data unit session, and
transmit, to a network exposure function, the quality of service flow mapping information.

Various embodiments may preferably implement the following feature:
Preferably, the wireless device further comprises a processor configured to perform a wireless communication method of any of the foregoing described methods.

The present disclosure relates to a wireless device, comprising:
a processor, configured to subscribe, to a session management function, quality of service flow mapping information of a packet data unit session, and
a communication unit, configured to receive, from the session management function, the quality of service flow mapping information.

Various embodiments may preferably implement the following feature:
Preferably, the processor is further configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
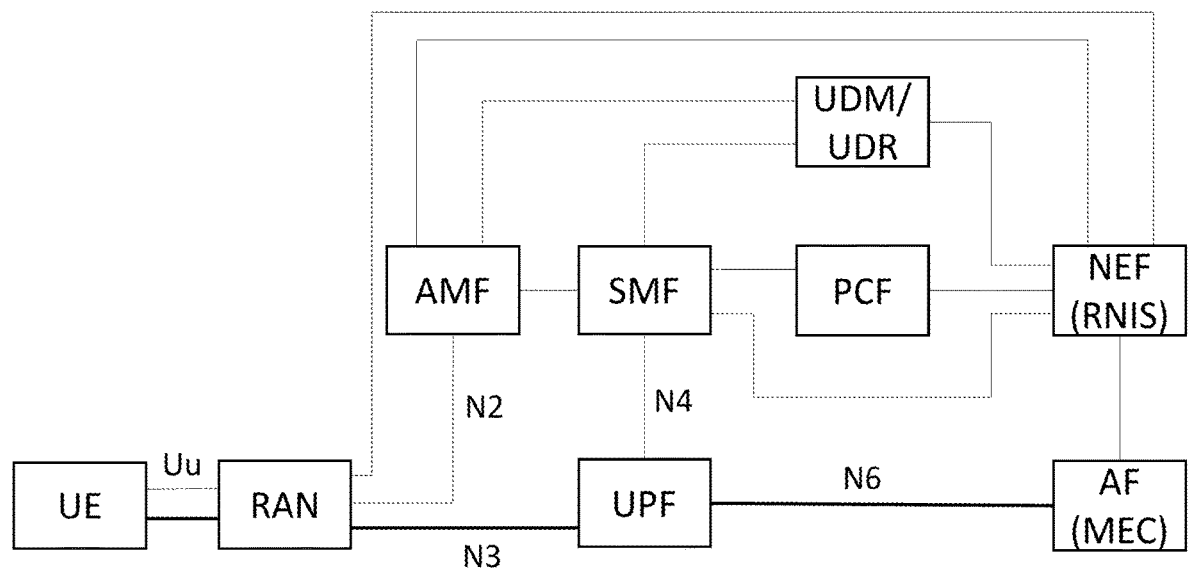
FIG. 1 shows a schematic diagram of a network according to an embodiment of the present disclosure.

FIG. 1 shows a schematic diagram of a network according to an embodiment of the present disclosure. The network functions and network components shown in FIG. 1 are illustrated in the following.

1) UE: User equipment.

2) RAN: Radio access network node, wherein an interface between the UE and the RAN is called Uu interface. In the present disclosure, the radio access network node may be abbreviated as RAN or RAN node.

3) AMF: Access and Mobility Management function.

The AMF includes the following functionalities: the registration management, the connection management, the reachability management and the mobility management. In addition, the AMF also performs the access authentication and the access authorization. The AMF is the non-access-stratum (NAS) security termination and relays the session management (SM) NAS between the UE and the SMF, etc. In FIG. 1, the interface between the AMF and the RAN is named N2 interface.

4) SMF: Session Management Function

The SMF includes the following functionalities: the session establishment, the modification and release, the UE internet protocol (IP) address allocation & management (including optional authorization functions), the selection and control of UP function, the downlink data notification, etc.

5) UPF: User Plane Function

The UPF includes the following functionalities: serving as an anchor point for intra-/inter-radio access technology (RAT) mobility, the packet routing & forwarding, the traffic usage reporting, the quality of service (QoS) handling for the user plane, the downlink packet buffering and downlink data notification triggering, etc. In FIG. 1, the interface between the SMF and the UPF is named N4 interface and the interface between the UPF and the RAN is named N3 interface.

6) NEF: Network Exposure Function.

The NEF supports exposure of capability and events of the network towards an application function (AF). The third-party applications can invoke the service provided by the network via the NEF and the NEF performs the authentication and authorization of the third-party applications. The NEF also provides the translation of the information exchanged with the AF and the information exchanged with the internal network function. In this embodiment, the RAN network information service (RNIS) is combined (e.g. deployed) with the NEF.

7) AF: Application Function

The AF interacts with the 3GPP core network in order to provide the services, e.g., to support: the application influence on traffic routing, the accessing network exposure function, interacting with the policy framework for policy control, etc. The AF may be trusted by the operator of the data network and can be allowed to interact directly with relevant network functions. The AF which is not allowed by the operator to access directly the network functions shall use the external exposure framework via the NEF to interact with the relevant network functions. In this embodiment, the AF may be a multi-access edge computing (MEC) applications or a MEC platforms which are the consumers of radio network information of the RAN. In FIG. 1, the interface between the AF and the UPF is named N6 interface.

8) PCF: Policy Control Function

The PCF provides policy rules to control plane functions, to enforce the policy rules. Specifically, the PCF provides access and mobility related policies (e.g. AM policies) to the AMF and the AMF enforces them during a mobility procedure. In addition, the PCF provides UE access selection and packet data unit (PDU) session selection related policies (e.g. UE policies) to the AMF and the AMF forwards the UE policies to the UE. The PCF also provides session management related policies (e.g. SM policies) to the SMF and the SMF enforces the session management related policies. In an embodiment, the PCF may be deployed in a distributed manner and each distributed PCF may support different functions in the same public land mobile network (PLMN). In an embodiment, after receiving a request from the AF, the PCF uses an address or an identity of related UE to bind the request to an associated PDU session and accordingly updates the AM policies and/or the SM policies.

9) UDR: Unified Data Repository

The UDR supports the storage and retrieval of subscription data by a unified data management (UDM), storage and retrieval of structured data for exposure, application data (including packet flow descriptions (PFDs) for application detection, AF request information for multiple UEs, etc.), storage and retrieval of NF (network function) group identifications (IDs) corresponding to subscriber identifiers (e.g. IP multimedia subsystem (IMS) private user identity (IMPI) and/or IMS public user identity (IMPU)).

10) UDM: Unified Data Management

The UDM is configured to generate a 3GPP authentication and key agreement (AKA) authentication credential, to access authorization based on subscription data, UE's serving NF registration management (e.g. storing serving AMF for UE, storing serving SMF for UE's PDU session), to manage subscriptions, etc. The UDM accesses the UDR to retrieve UE subscription data and store UE context into the UDR. In this embodiment, the UDM and the UDR are deployed together.

In FIG. 1, a direct interface between the NEF (RNIS) and the RAN is introduced. Via the direct interface, the NEF (RNIS) is able to obtain the radio network information from the RAN. In the following, embodiments related to, e.g., how the NEF (RNIS) acknowledges the RAN on which the UE camps via the direct interface and/or how the NEF (RNIS) identifies the UE on the direct interface are disclosed.

Figure 2:
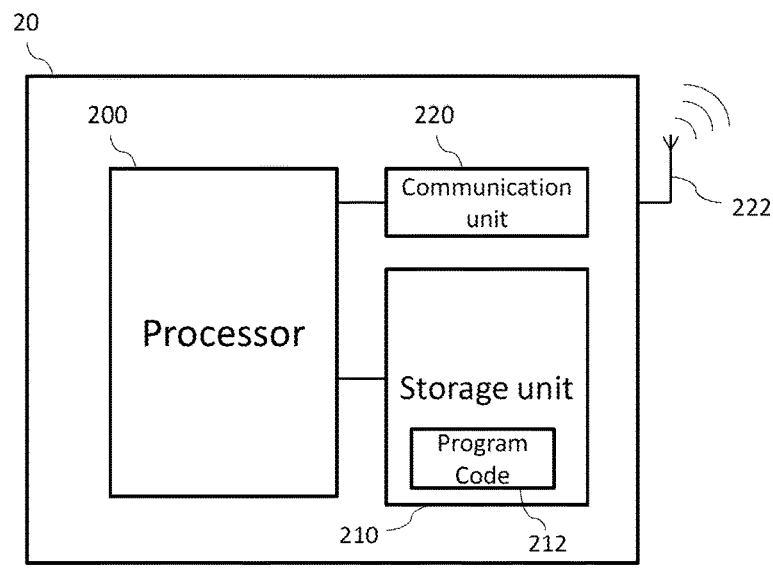
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
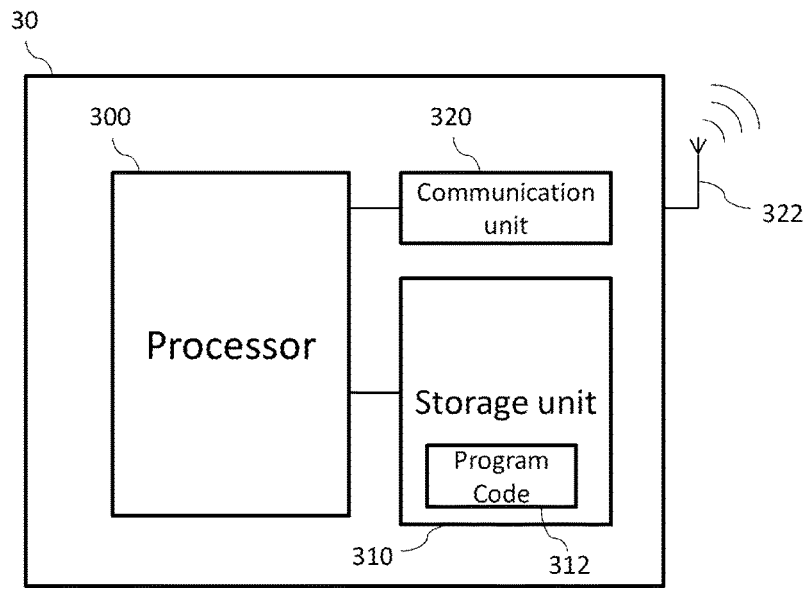
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a wireless device, a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

In an embodiment, the NEF (RNIS) subscribes an event on the RAN node information to the AMF. Based on the subscription from the NEF (RNIS), the AMF notifies the NEF (RNIS) of the RAN node information, wherein the RAN node information includes an address of related RAN and a temporary identity configured to uniquely identify the UE context in the RAN node. Based on the RAN node information, the NEF (RNIS) is able to subscribe the radio network information directly to the RAN node according to an AF request. Similarly, the RAN node is able to direct notify the NEF (RNIS) of the requested radio network information, e.g., via the direct link between the NEF (RNIS) and the RAN node.

Figure 4:
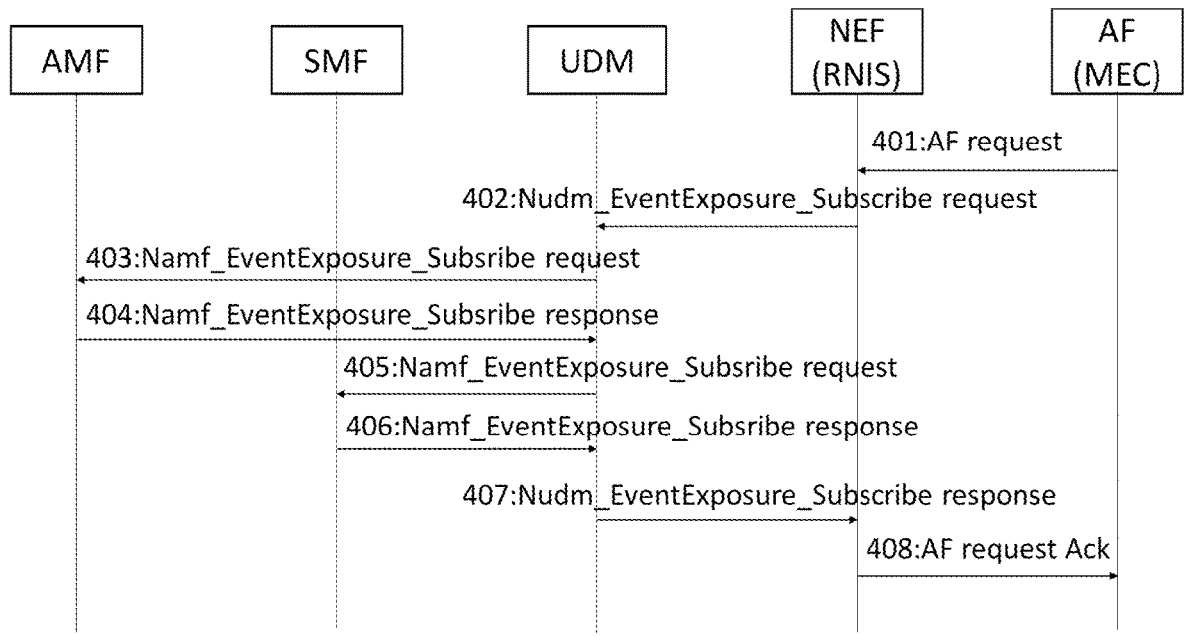
FIG. 4 shows a schematic diagram of a process according to an embodiment of the present disclosure.

FIG. 4 shows a schematic diagram of a process according to an embodiment of the present disclosure. Note that the AMF, the SMF, the UDM, the NEF (RNIS) and the AF (MEC) may be those shown in FIG. 1. The embodiment shown in FIG. 4 shows that how the NEF (RNIS) subscribes the RAN node information to the AMF via the UDM. In addition to the RAN node information, if the radio network information requested by the NEF (RNIS) includes radio bearer information, the NEF (RNIS) may also subscribe quality of service (QoS) flow mapping information of PDU session(s) to the SMF. In an embodiment, the QoS flow mapping information includes service data flow information and/or associated QoS flow ID(s) and/or PDU session ID(s). More specifically, the AF sends an AF request (message) to the NEF (RNIS) in step 401. In an embodiment, the AF request (message) comprises at least one of the following information:

Address(es) (e.g. IP(s) and/or ethernet address(es) of UE(s), data network name(s) (DNN(s)), and/or single-network slice selection assistance information (S-NS-SAI): Note that the address(es) of the UE(s), the DNN(s) and/or the S-NSSAI is used for identifying corresponding PDU session(s) which is the subject of the AF request. In an embodiment, the AF request may target established PDU session(s). Under such a condition, the address(es) of the UE(s) is included in the AF request.

GPSI (Generic Public Subscription Identifiers): The GPSI is configured to identify the UE(s).

A radio network information (RNI) request: In an embodiment, the RNI request may comprise event(s) associated with the RNI. For example, the event(s) associated with the RNI may comprise at least one of:

a) when the RAN detects a cell change, the RAN reports information of the latest cell;

b) when the RAN detects a radio access bearer (RAB); establishment/modification/release, the RAN reports information of the latest RAB;

c) when RAN performs a new UE measurement, the RAN reports corresponding UE measurement report;

d) when RAN performs new UE timing advance measurements, the RAN reports the corresponding UE timing advance measurement result(s);

e) when the UE carrier aggregation reconfigurations changes, the RAN reports the latest (new) carrier aggregation configuration;

f) when an existing subscription expires, the RAN reports the event.

In an embodiment, the AF request may comprise an AF transaction ID. The AF sends the AF request to the NEF (RNIS).

In step 402, the NEF (RNIS) ensures necessary authorization control(s), including a throttling of the AF request and/or a mapping from the information provided by the AF to information needed by the 5G core (5GC) network. For example, the necessary authorization control(s) may comprise the mapping from the AF-service-identifier to the DNN and the S-NSSAI.

Based on the GPSI, the NEF discovers the UDM serving the UE and invokes a Nudm_EventExposure_Subscribe service (e.g. transmitting a Nudm_EventExposure_Subscribe request comprising event ID(s), a NEF address, the GPSI, the DNN, the S-NSSAI) in the UDM. In an embodiment, the event ID(s) in the Nudm_EventExposure_Subscribe request indicates the event(s) associated with the subscribed RAN node information. As an alternative or in addition, the event ID(s) in the Nudm_EventExposure_Subscribe request may indicate the subscribed QoS flow mapping information of the PDU session identified by the DNN and the S-NSSAI.

In step 403, based on the currently registered AMF information, the UDM invokes the Namf_EventExposure_Subscribe service in the AMF (e.g. transmitting, to the AMF, the Namf_EventExposure_Subscribe request comprising the event ID(s), the NEF address, the S-NSSAI, the DNN). In this step, the event ID(s) in the Namf_EventExposure_Subscribe request indicates the RAN node information subscribed to the AMF. In addition, the DNN and the S-NSSAI are used to identify the PDU session.

In step 404, the AMF stores the subscription information in the UE context and sends a Namf_EventExposure_Subscribe response to the UDM.

In step 405, based on the currently registered SMF information of the associated S-NSSAI and DNN, the UDM invokes the Nsmf_EventExposure_Subscribe service in the SMF (e.g. transmitting, to the SMF, a Nsmf_EventExposure_Subscribe request comprising event ID(s), the NEF address, the PDU session ID). In this step, the event ID(s) in the Nsmf_EventExposure_Subscribe request indicates the subscribed QoS flow mapping information of the PDU session identified by the PDU session ID.

In step 406, the SMF stores the subscription information in the UE context and sends a Namf_EventExposure_Subscribe response to the UDM.

In step 407, the UDM sends a Nudm_EventExpsoure_Subscribe response to the NEF.

In step 408, the NEF sends an AF request acknowledge (ACK) to the AF.

Figure 5:
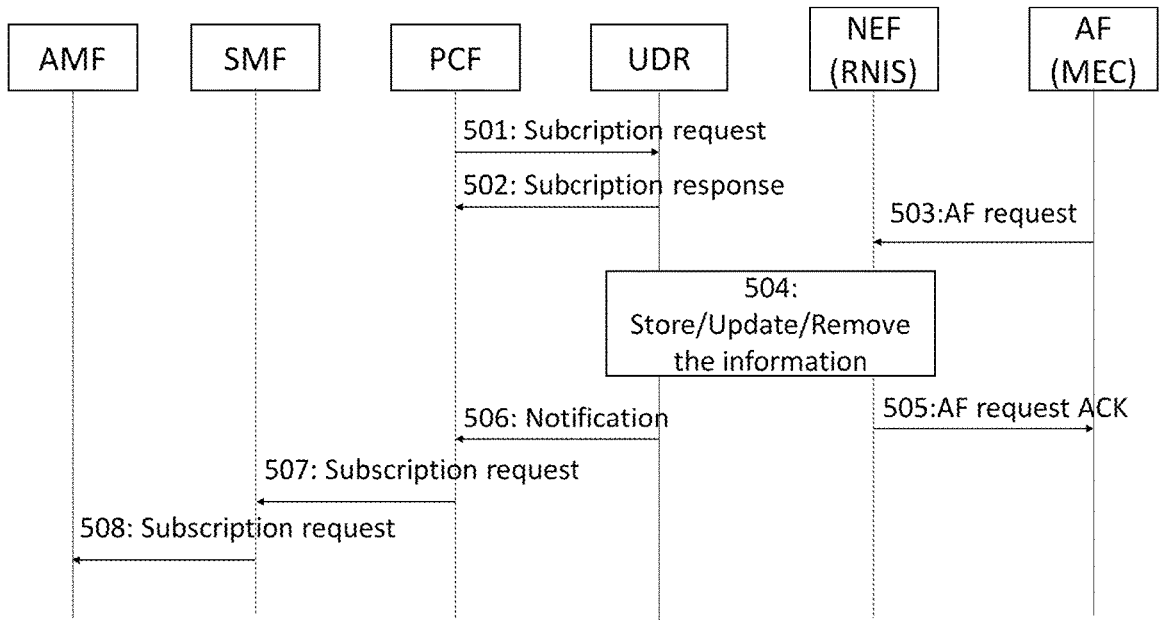
FIG. 5 shows a schematic diagram of a process according to an embodiment of the present disclosure.

FIG. 5 shows a schematic diagram of a process according to an embodiment of the present disclosure. The embodiment shown in FIG. 5 describes how the NEF subscribes the RAN node information to the AMF via the PCF. Note that the AMF, the SMF, the PCF, the UDR, the NEF (RNIS) and the AF (MEC) shown in FIG. 5 may be those shown in FIG. 1.

In detail, based on a local configuration, the PCF subscribes any modification of application data to the UDR (step 501). In this embodiment, the UDR with the subscriptions from the PCF is deployed close to the PCF. For example, the PCF may subscribe the event(s) to the UDR deployed in the same province or the same region.

In step 502, the UDR stores the subscription and sends a subscription response to the PCF. In step 503, the AF sends an AF request (message) to the NEF (RNIS). In an embodiment, the AF request (message) comprises at least one of the following information:

Address(es) (e.g. IP(s) and/or ethernet address(es) of UE(s), data network name(s) (DNN(s)), and/or single-network slice selection assistance information (S-NSSAI): Note that the address(es) of the UE(s), the DNN(s) and/or the S-NSSAI is used for identifying corresponding PDU session(s) which is the subject of the AF request. In an embodiment, the AF request may target established PDU session(s). Under such a condition, the address(es) of the UE(s) is included in the AF request.

GPSI (Generic Public Subscription Identifiers): The GPSI is configured to identify the UE(s).

A radio network information (RNI) request: In an embodiment, the RNI request may comprise event(s) associated with the RNI. For example, the event(s) associated with the RNI may comprise at least one of:

a) when the RAN detects a cell change, the RAN reports information of the latest cell;

b) when the RAN detects a radio access bearer (RAB); establishment/modification/release, the RAN reports information of the latest RAB;

c) when RAN performs a new UE measurement, the RAN reports corresponding UE measurement report;

d) when RAN performs new UE timing advance measurements, the RAN reports the corresponding UE timing advance measurement result(s);

e) when the UE carrier aggregation reconfigurations changes, the RAN reports the latest (new) carrier aggregation configuration;

f) when an existing subscription expires, the RAN reports the event.

In an embodiment, the AF request may comprise an AF transaction ID. The AF request is sent to the NEF (RNIS).

In step 504, the NEF (RNIS) ensures necessary authorization control(s), including a throttling of the AF request and/or a mapping from the information provided by the AF to information needed by the 5GC network. For example, the necessary authorization control(s) may comprise the mapping from the AF-service-identifier to the DNN and the S-NSSAI and/or the mapping from external group identifier (s) to internal group identifier(s).

In an embodiment, the NEF stores information of the AF request as application data in the UDR. When the NEF requests the RAN node information from the AMF and/or the QoS flow mapping information from the SMF, the NEF also adds subscription information including the event ID(s) identifying the RAN node information notification and/or the QoS flow mapping notification and the notification address of the NEF in the application data.

In step 505, the NEF (RNIS) sends an AF request ACK to the AF.

In step 506, the PCF(s), which subscribes the notification to the UDR in step 501, receives a Nudr_DM_Notify notification of data changes from the UDR and stores the application data locally.

In step 507, during a PDU session establishment procedure, the PCF sends the subscription information (e.g. the event IDs and/or the NEF address) to the SMF in policy and charging control (PCC) rules of the PDU session. In an embodiment, the event ID(s) indicates the RAN node information subscribed to the AMF and/or the QoS flow mapping information subscribed to the SMF.

In step 508, the SMF further sends the subscription information (e.g. the event ID(s) and/or the NEF address) to the AMF. In this step, the event ID(s) indicates the RAN node information subscribed to AMF. In an embodiment, the event ID(s) is associated with the PDU session identified by the S-NSSAI and the DNN. In an embodiment, the AMF stores the subscription information in the UE context.

Figure 6:
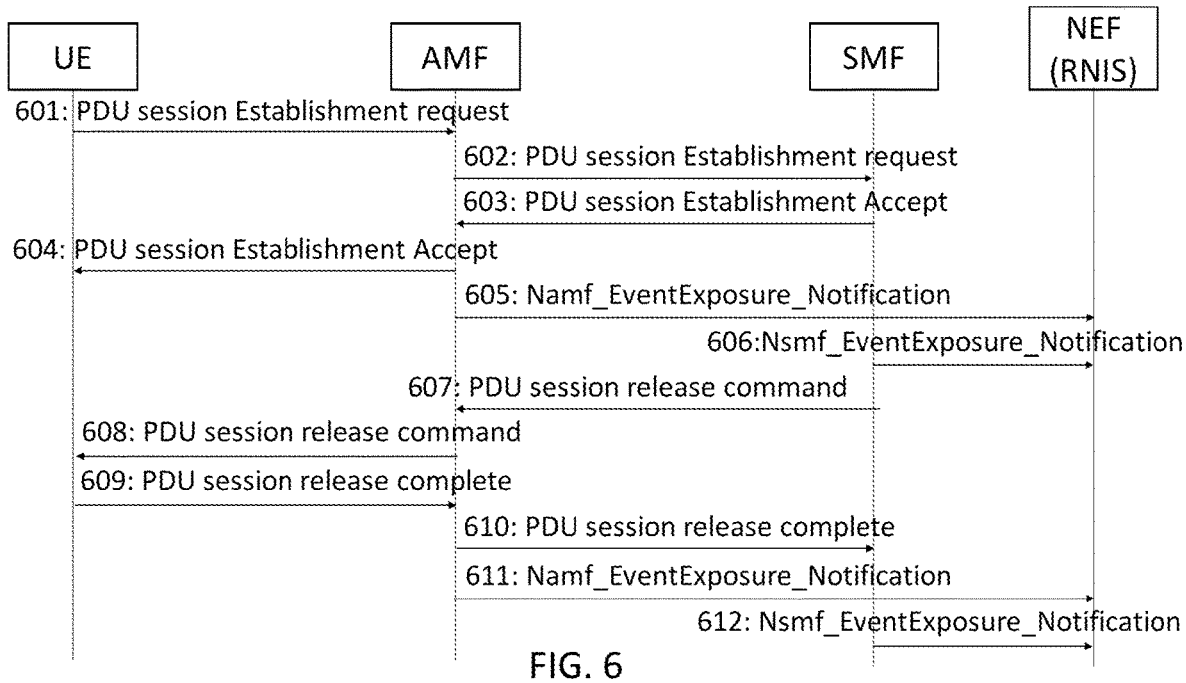
FIG. 6 shows a schematic diagram of a process according to an embodiment of the present disclosure.

FIG. 6 shows a schematic diagram of a process according to an embodiment of the present disclosure. The embodiment shown in FIG. 6 shows how to notify the NEF (RNIS) of the RAN node information during a PDU session establishment procedure and a PDU session release procedure. Note that the UE, the AMF, the SMF and the NEF (RNIS) shown in FIG. 6 may be those shown in FIG. 1.

More specifically, the UE initiates a UE requested PDU session establishment procedure by transmitting a NAS (non-access stratum) message, which comprises a PDU session establishment request within a N1 SM container (step 601). In an embodiment, the PDU session establishment request includes a PDU session ID, a requested PDU session type, a requested S-NSSAI indicating a network slicing, a requested DNN, etc.

In step 602, the AMF selects an SMF based on the S-NSSAI and the DNN and forwards the (UE requested) PDU session establishment request to the selected SMF.

In step 603, the SMF performs an authorization on whether the PDU session establishment request can be accepted. When the PCF is deployed, the SMF may contact the PCF to receive PCC rules for the requested PDU session. If the SMF accepts the PDU session establishment request, the SMF sends a PDU session establishment accept to the AMF. In an embodiment, the PDU session establishment accept may be sent to the AMF together with a QoS profile in N2 information, to establish corresponding radio resources in the RAN node (not shown in FIG. 6) serving the UE.

In step 604, the AMF sends a PDU session establishment accept to the UE. For simplicity, interactions between the AMF and the RAN node serving the UE (not shown in FIG. 6) for establishing the radio resources for the PDU session are not described herein.

In step 605, the AMF determines that there is the subscription on the RAN node information from the NEF and the associated PDU session is activated (e.g. radio resources of the PDU session are established in the RAN node). In such a condition, the AMF sends a notification (message) (e.g. Namf_EventExposure_Notification) to the NEF (RNIS), wherein this notification includes the RAN node information associated with the RAN node (serving the UE). In an embodiment, the RAN node information associated with the RAN node includes an address of the RAN and a temporary identity in the RAN node. In an embodiment, the address of the RAN may be a transport network layer (TNL) association transport address (e.g. an IP address and port number(s)) used for the N2 interface between the RAN and the AMF. In an embodiment, the TNL association is established during a NG setup procedure. In an embodiment, the temporary identity in the RAN node refers to a RAN UE NGAP ID. In an embodiment, the RAN UE NGAP ID is sent to the AMF in the first N2 message from the RAN to the AMF, such as an initial UE message, a path switch request, a handover request ACK, etc. In an embodiment, the NEF (RNIS) stores the RAN node information.

In step 606, the SMF determines there is a subscription on the QoS flow mapping information from the NEF and the associated PDU session is established (regardless of whether the radio resources of the PDU session are established in the RAN node), the SMF sends a notification (message) (e.g. Nsmf_EventExposure_Notification) to the NEF (RNIS). In an embodiment, the notification comprises the QoS flow mapping information. In an embodiment, the QoS flow mapping information includes the mapping information between the service data flow and the QoS flow (identified by the QoS flow ID) within the PDU session (identified by the PDU session ID). In an embodiment, the NEF (RNIS) stores the QoS flow mapping information. In an embodiment, when a new QoS flow is established or a QoS flow is released, the SMF further sends another notification to the NEF (RNIS) to update the QoS flow mapping information.

In step 607, the SMF may determine to release the PDU Session and sends a PDU session release command to the AMF.

In step 608, the AMF forwards the PDU session release command to the UE.

In step 609, the UE releases the PDU session and sends a PDU session release complete to the AMF.

In step 610, the AMF forwards the PDU session release complete to the SMF and the SMF releases the PDU session context.

In step 611, the AMF determines there is the subscription on the RAN node information from the NEF (RNIS) of the PDU session and sends a notification (e.g. Namf_EventExposure_Notification) to the NEF (RNIS) to delete the RAN node information in the NEF (RNIS). Based on the notification, the NEF(RNIS) removes the RAN node information.

In step 612, the SMF determines there is the subscription on the QoS flow mapping information from the NEF (RNIS), the SMF sends a notification (e.g. Nsmf_EventExposure_Notification) to the NEF (RNIS), to delete the QoS flow mapping information in the NEF (RNIS). Based on this notification, the NEF removes the QoS flow mapping information.

Figure 7:
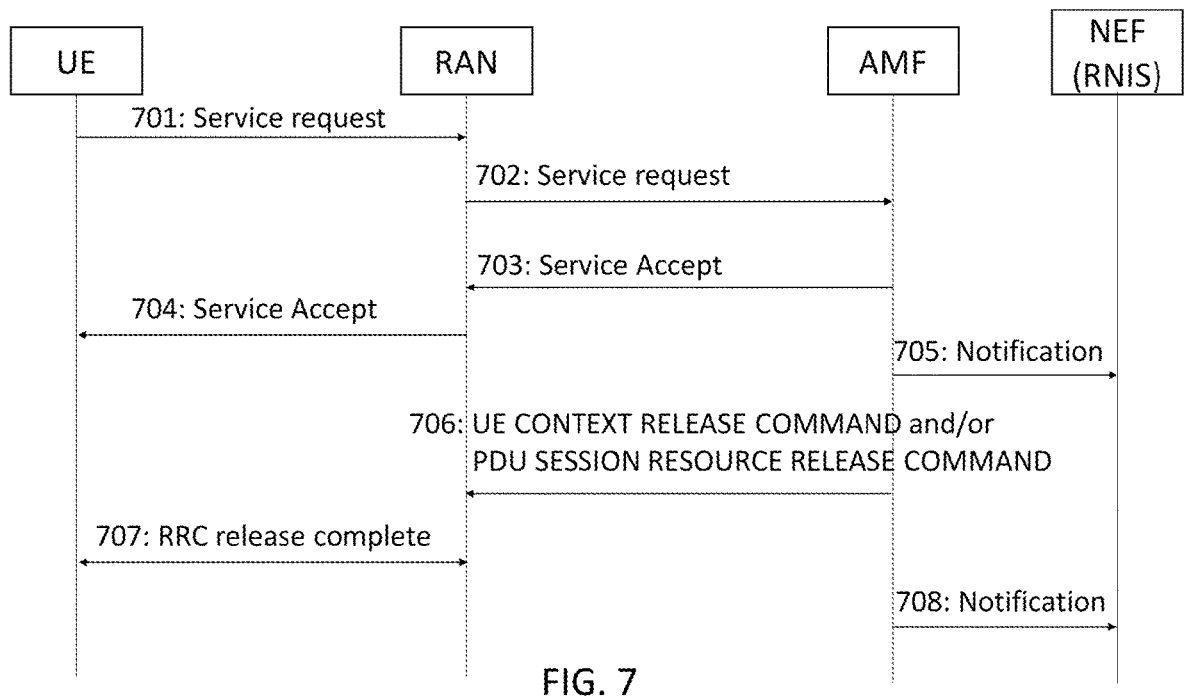
FIG. 7 shows a schematic diagram of a process according to an embodiment of the present disclosure.

FIG. 7 shows a schematic diagram of a process according to an embodiment of the present disclosure. The process shown in FIG. 7 shows an embodiment of notifying the NEF (RNIS) of the RAN node information when the UE context in the RAN node is established or removed. Note that the UE, the RAN, the AMF and the NEF (RNIS) shown in FIG. 7 may be those shown in FIG. 1.

More specifically, when the UE is in an IDLE mode and has mobile originated (MO) data and/or an MO signaling or receives a paging request from the network, the UE establishes a radio resource control (RRC) connection and initiates (e.g. transmits or sends) a service request over the RRC connection to the RAN (step 701). In an embodiment, the service request includes information used for identifying the PDU session which is requested to be activated for the MO data.

In step 702, the RAN node creates a UE context and forwards the service request to the AMF in an initial UE message. In an embodiment, the initial UE message includes the RAN UE NGAP ID configured to uniquely identify the UE context in the RAN node.

In step 703, the AMF activates the PDU session towards the SMF and the SMF allocates the user plane resource for the PDU session. The AMF then sends a service accept to the RAN.

In step 704, the RAN sends the service accept to the UE.

In step 705, the AMF determines that there is the subscription on the RAN node information from the NEF and the associated PDU session is activated. In such a condition, the AMF sends a notification (message) (e.g. Namf_EventExposure_Notification) to the NEF (RNIS), wherein this notification includes the RAN node information associated with the RAN. In an embodiment, the RAN node information associated with the RAN includes an address of the RAN and a temporary identity in the RAN. In an embodiment, the address of the RAN may be a TNL association transport address (e.g. an IP address and port number(s)) used for the N2 interface between the RAN and the AMF. In an embodiment, the TNL association is established during a NG setup procedure. In an embodiment, the temporary identity in the RAN refers to a RAN UE NGAP ID. In an embodiment, the NEF (RNIS) stores the RAN node information.

In step 706, when the AMF determines to release the UE context in the RAN, the AMF sends a UE context release command to the RAN node. As an alternative or in addition, when the AMF determines to delete the PDU session in the RAN, the AMF sends a PDU SESSION RESOURCE RELEASE COMMAND to the RAN.

In step 707, the RAN releases the RRC connection between the UE and the RAN node and/or delete the PDU session context in the RAN.

In step 708, the AMF determines there is the subscription on the RAN node information from the NEF (RNIS) and the associated PDU Session is deactivated. Thus, the AMF sends a notification to the NEF (RNIS), to delete the RAN node information in the NEF(RNIS). Based on this notification, the NEF (RNIS) removes the RAN node information.

Figure 8:
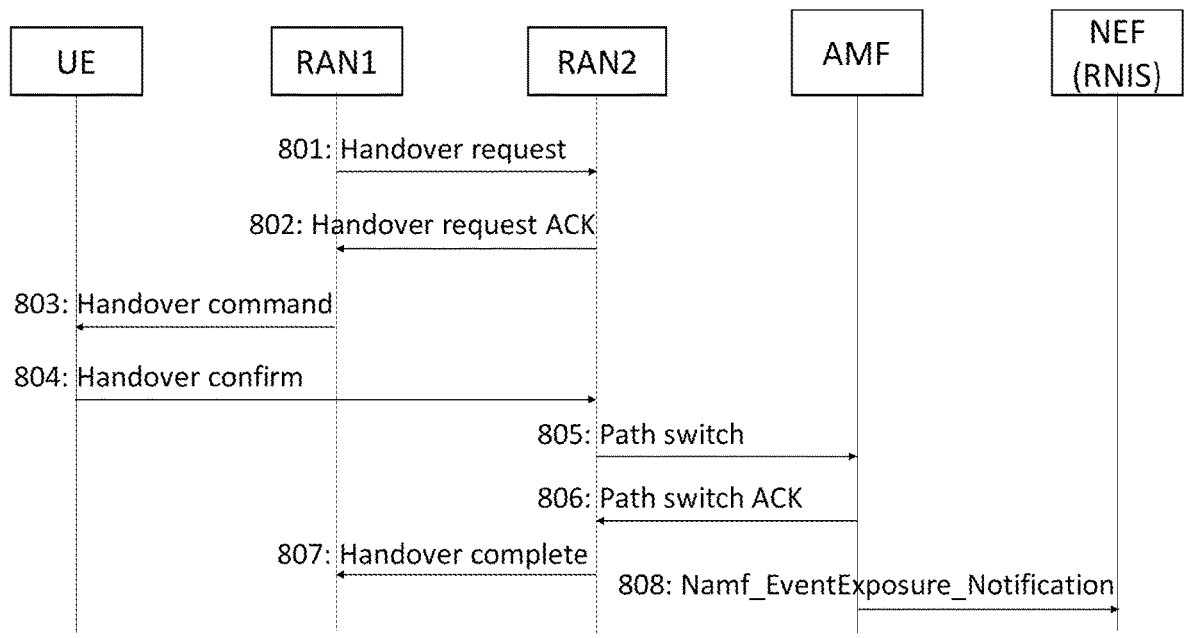
FIG. 8 shows a schematic diagram of a process according to an embodiment of the present disclosure.

FIG. 8 shows a schematic diagram of a process according to an embodiment of the present disclosure. The process shown in FIG. 8 shows an embodiment of notifying the NEF (RNIS) of the RAN node information after an Xn based handover. Note that each of the RAN1 and the RAN2 shown in FIG. 8 refers to the RAN shown in FIG. 1. In addition, the UE, the AMF and the NEF (RNIS) shown in FIG. 8 may be those shown in FIG. 1.

More specifically, the RAN1 initiates the Xn based handover towards the RAN2 by sending a handover request (message) to the RAN2, e.g., based on radio measurements (step 801). In step 802, the RAN2 reserves radio resources for QoS flows of a PDU session received from the RAN1 and returns a handover request ACK to the RAN1.

In step 803, the RAN1 sends a handover command (message) to the UE. In an embodiment, the handover command includes the radio resources received from the RAN2.

In step 804, based on the radio resources received from the RAN1, the UE accesses to the RAN2 and sends a handover confirm to the RAN2.

In step 805, the RAN2 sends a path switch request (message) including N2 SM information towards the AMF. In an embodiment, the path switch request includes the RAN UE NGAP ID, to uniquely identify the UE context in the RAN2.

In step 806, the AMF returns a path switch response to the RAN1.

In step 807, the RAN2 sends a handover complete (message) to the RAN1, to indicate that the handover successes.

Figure 9:
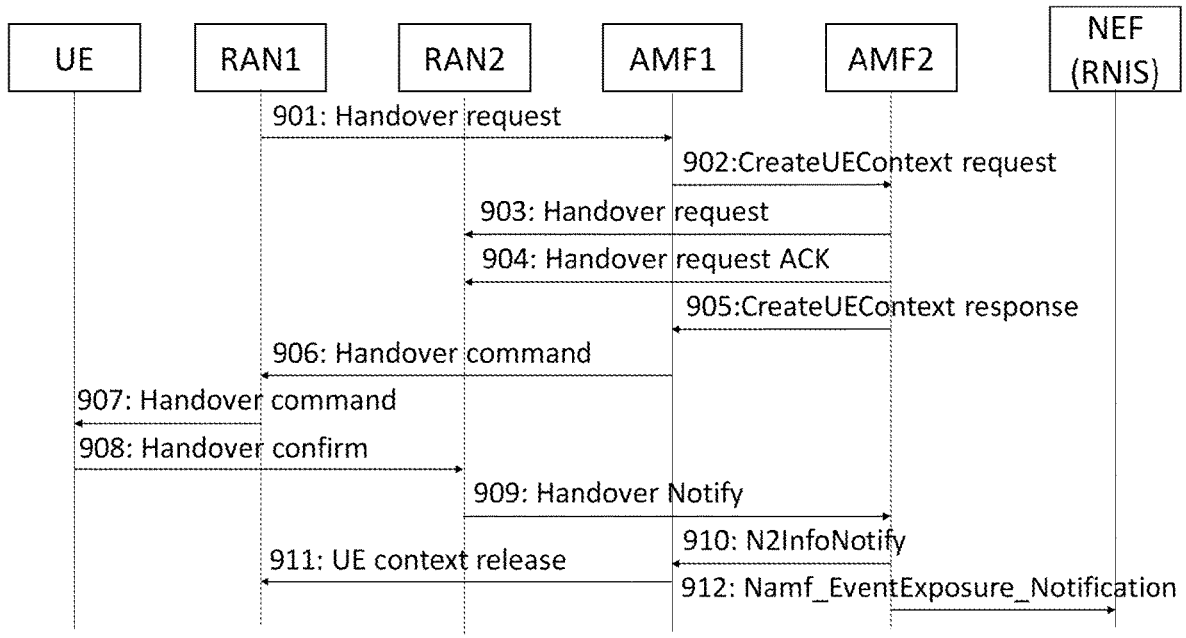
FIG. 9 shows a schematic diagram of a process according to an embodiment of the present disclosure.

In step 808, the AMF determines that there is the subscription on the RAN node information from the NEF (RNIS) and the associated PDU session is activated. In such a condition, the AMF sends a notification (message) to the NEF (RNIS), wherein the notification includes the RAN node information. In an embodiment, the RAN node information includes a RAN node address and a temporary identity in the RAN. In an embodiment, the RAN node address refers to the TNL association transport IP address used for the N2 interface between the RAN and the AMF. As an alternatic or in addition, the temporary identity in the RAN could be the RAN UE NGAP ID. After receiving the RAN node information, the NEF (RNIS) stores the RAN node information. FIG. 9 shows a schematic diagram of a process according to an embodiment of the present disclosure. The process shown in FIG. 9 shows an embodiment of notifying the NEF (RNIS) of the RAN node information after a N2 based inter AMF handover. Note that each of the RAN1 and the RAN2 shown in FIG. 9 refers to the RAN shown in FIG. 1. Similarly, each of the AMF1 and the AMF2 shown in FIG. 9 refers to the AMF shown in FIG. 1. In addition, the UE and the NEF (RNIS) shown in FIG. 9 may be those shown in FIG. 1.

More specifically, based on radio measurement(s), the RAN1 sends a handover required message including target information and N2 SM information towards the AMF1 (step 901). In step 902, based on the target information, the AMF1 selects the AMF2 and sends a CreateUEContext request to the AMF2.

In step 903, the AMF2 sends a handover request to the RAN2.

In step 904, the RAN2 reserves radio resources for QoS flows and N3 tunnel information of a PDU Session and returns a handover request (message) ACK to the AMF2. In an embodiment, the handover request includes a RAN UE NGAP ID, to uniquely identify the UE context in the RAN2.

In step 905, the AMF2 sends a CreateUEContext response to the AMF1.

In step 906, the AMF1 sends a handover command to the RAN1.

In step 907, the RAN1 sends a handover command (message) to the UE. In an embodiment, the handover command includes the radio resources received from the RAN2.

In step 908, based on the radio resources received from the RAN1, the UE accesses to the RAN2 and sends a handover confirm to the RAN2.

In step 909, the RAN2 sends a handover notify to the AMF2.

In step 910, the AMF2 sends a N2InfoNotify to the AMF1.

In step 911, the AMF1 sends a release resource (message) to the RAN1, to confirm that the handover successes.

In step 912, the AMF determines that there is the subscription on the RAN node information from the NEF (RNIS) and the associated PDU session is activated. Under such a condition, the AMF sends a notification (message) to the NEF (RNIS), wherein the notification includes the RAN node information. In an embodiment, the RAN node information includes a RAN node address and a temporary identity in the RAN. In an embodiment, the RAN node address refers to the TNL association transport IP address used for the N2 interface between the RAN and the AMF. As an alternatic or in addition, the temporary identity in the RAN could be the RAN UE NGAP ID.

After receiving the RAN node information, the NEF (RNIS) stores the RAN node information.

Figure 10:
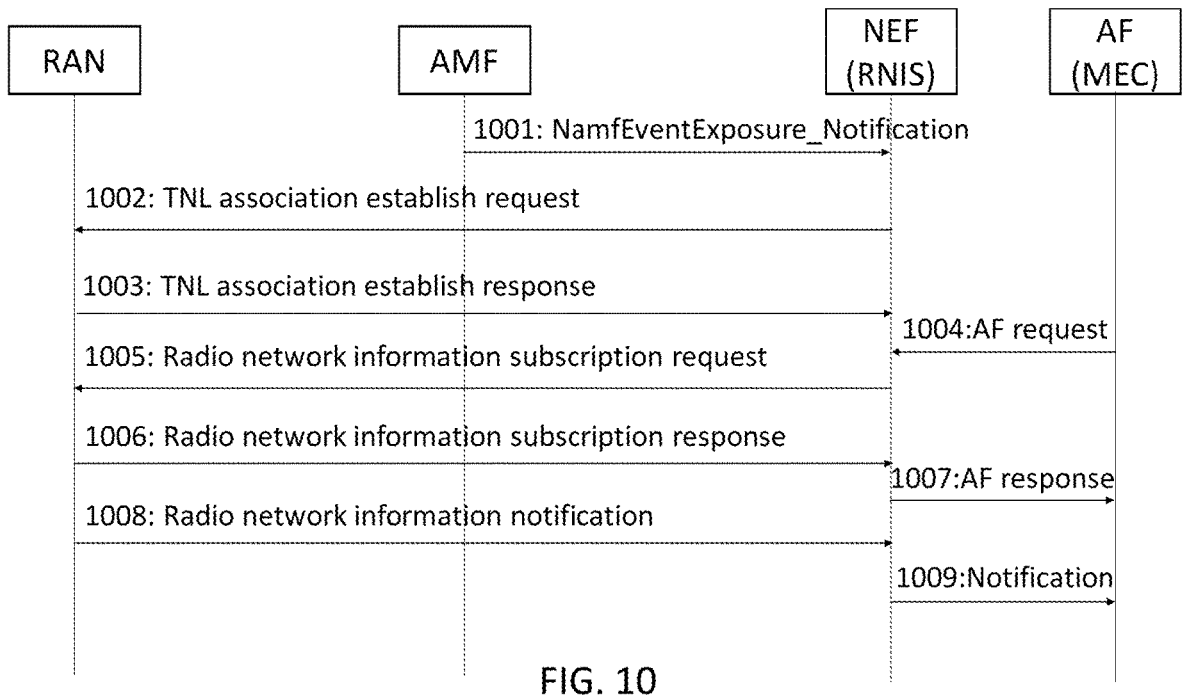
FIG. 10 shows a schematic diagram of a process according to an embodiment of the present disclosure.

FIG. 10 shows a schematic diagram of a process according to an embodiment of the present disclosure. The process shown in FIG. 10 shows an embodiment of the NEF (ENIS) using the received RAN node information to obtain the radio network information from the RAN node. Note that the RAN, the AMF, the NEF (RNIS) and the AF (MEC) shown in FIG. 10 may be those shown in FIG. 1.

In detail, the AMF sends a Namf_EventExposure_Notification (message) to the NEF(RNIS), wherein the Namf_EventExposure_Notification includes the RAN node information (step 1001). In an embodiment, the RAN node information includes a RAN address and a temporary identity in the RAN. In an embodiment, the RAN node address may be the TNL association transport address (e.g. the IP address and the port number) used for the N2 interface between the RAN and the AMF. In an embodiment, the TNL association is established during a NG setup procedure. In an embodiment, the temporary identity in the RAN node may be a RAN UE NGAP ID.

In step 1002, when the TNL association is configured to be used between the NEF (RNIS) and the RAN and the TNL association has not been established, the NEF (RNIS) uses the TNL association transport address of the RAN node as a target address to establish the TNL association between the RAN node and the NEF (RNIS).

In step 1003, the RAN node confirms the TNL association establishment by sending a TNL association establish response (message) to the NEF(RNIS).

In step 1004, the NEF (RNIS) may receive an AF request from the AF (MEC). In an embodiment, the AF request may also be sent before step 1001. In an embodiment, the AF request may be configured to request at least one of the following requested radio network information:
- A) when the RAN detects a cell change, the RAN reports the latest cell information;
- B) when the RAN detects an RAB establishment/modification/release, the RAN reports the latest radio bearer information;
- C) when RAN performs a new UE measurement, the RAN reports a corresponding UE measurement report;
- D) when RAN performs new UE timing advance measurements, the RAN reports corresponding UE timing advance measurement results;
- E) when the UE carrier aggregation reconfigurations change, the RAN reports the new carrier aggregation configuration;
- F) when the existing subscription expires, the RAN reports the event.

In an embodiment, the AF request may also comprise an AF transaction ID.

In step 1005, the NEF(RNIS) sends a radio network information subscription request to the RAN over the TNL association between the RAN node and the NEF. In an embodiment, the radio network information subscription request includes the requested radio network information and the associated event ID(s). As an alternative or in addition, the radio network information subscription request may also include a RAN UE NGAP ID which is configured to uniquely identify the UE context. In an embodiment of the NEF requesting radio bearer information of a PDU session, the NEF includes an ID of the PDU session and a QoS flow ID in the radio network information subscription request. In an embodiment, the NEF determines the QoS flow and the PDU session based on QoS flow mapping information received from the SMF.

In step 1006, the RAN responses the NEF (RNIS) by an radio network information subscription response.

In step 1007, the NEF (RNIS) returns an AF response (message) to the AF. In an embodiment, the AF response includes results of the subscription.

In step 1008, the RAN sends a radio network information notification (message) towards the NEF(RNIS) immediately, and/or periodically, and/or after detecting of the subscribed event(s) received in the radio network information subscription request from the NEF(RNIS).

In an embodiment, the radio network information comprises at least one of cell information, RAB information, a measurement report, a timing advance measurement report, a carrier aggregation configuration or an event of the subscription expiring.

In an embodiment, the subscribed invents comprises that the RAN detecting a cell change, that the wireless network node detecting at least one of an establishing, that a modification or a release of an RAB, that the wireless network node performing a measurement towards the wireless terminal, or that the wireless network node performing a timing advance measurement towards the wireless terminal, or the subscription expiring.

In step 1009, based on the QoS flow binding information received from the SMF and the radio network information received from the RAN, the NEF determines the associated service data flow and send a notification towards the AF (MEC), wherein this notification includes the radio network information associated with the service data flow.

Figure 11:
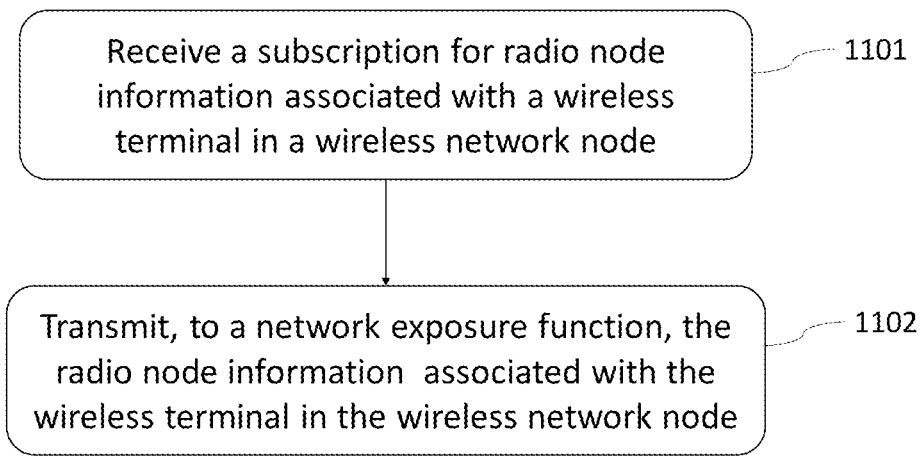
FIG. 11 shows a flowchart of a process according to an embodiment of the present disclosure.

FIG. 11 shows a flowchart of a process according to an embodiment of the present disclosure. The process shown in FIG. 11 may be used in the AMF (e.g. the wireless device or the network entity performing (e.g. comprising) the AMF) and comprises the following steps:

Step 1101: Receive a subscription for radio node information associated with a wireless terminal in a wireless network node.

Step 1102: Transmit, to a network exposure function, the radio node information associated with the wireless terminal in the wireless network node.

In FIG. 11, the AMF receives the subscription for radio node information (e.g. the RAN node information) associated with a wireless terminal (e.g. UE) in a wireless network node (e.g. RAN). For example, the ANF may receive the subscription for the radio node information based on the process shown in FIGS. 4 and/or 5. Next, the AMF transmits (e.g. sends) the radio node information to the NEF, e.g., when at least one event associated with the subscription occurs.

In an embodiment, the radio node information associated with the wireless terminal in the wireless network node comprises at least one of an address of the wireless network node or a temporary identification of a user equipment context in the wireless network node.

In an embodiment, the address of the wireless network node refers to a TNL association transport address.

In an embodiment, the temporary identification refers to a RAN UE NG ID.

In an embodiment, the radio node information is transmitted in at least one of an initial UE message, a path switch request message or a handover request acknowledge message.

Figure 12:
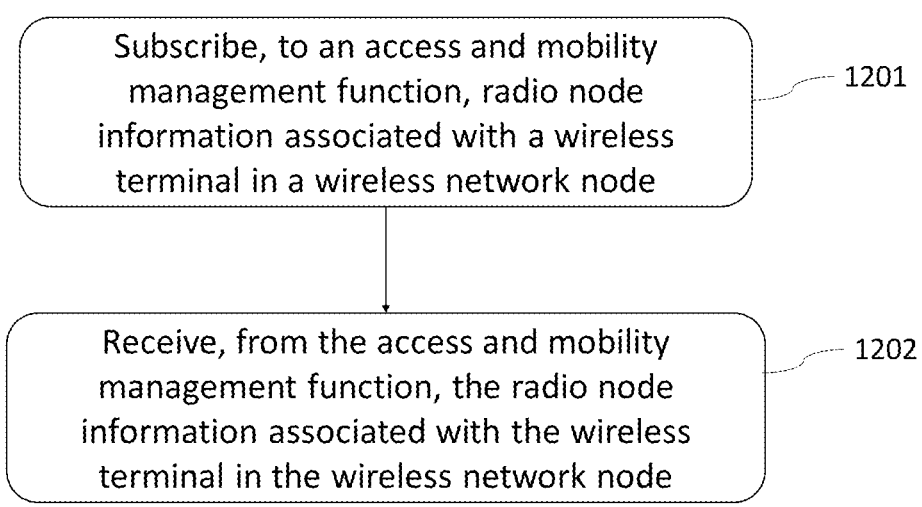
FIG. 12 shows a flowchart of a process according to an embodiment of the present disclosure.

FIG. 12 shows a flowchart of a process according to an embodiment of the present disclosure. The process shown in FIG. 12 may be used in the NEF (e.g. the wireless device or the network entity performing (e.g. comprising) the NEF) and comprises the following steps:

Step 1201: Subscribe, to an access and mobility management function, radio node information of associated with a wireless terminal in a wireless network node.

Step 1202: Receive, from the access and mobility management function, the radio node information associated with the wireless terminal in the wireless network node.

In FIG. 12, the NEF subscribes radio node information (e.g. RAN node information) associated with a wireless terminal in a wireless network node to an AMF. For example, the NEF may subscribe the radio node information to the AMF based on the process shown in FIGS. 4 and/or 5. Next, the NEF may receive the radio node information from the AMF.

In an embodiment, the NEF may subscribe the radio node information after receiving an AF request from an AF.

In an embodiment, the radio node information associated with the wireless terminal in the wireless network node comprises at least one of an address of the wireless network node or a temporary identification of a user equipment context in the wireless network node.

In an embodiment, the address of the wireless network node refers to a TNL association transport address.

In an embodiment, the temporary identification refers to a RAN UE NG ID.

In an embodiment, the radio node information is received in at least one of an initial user equipment message, a path switch request message or a handover request acknowledge message. In an embodiment, the NEF may establish a TNL association towards the wireless network node based on the radio node information associated with the wireless terminal in the wireless network node.

In an embodiment, via the TNL association, the NEF may transmit a request for radio network information (i.e. radio network information request) to the wireless network node and receive the radio network information from the wireless network node.

In an embodiment, the request for the radio network information comprises a temporary identification of a user equipment context in the wireless network node.

In an embodiment, the radio network information comprises at least one of cell information, radio access bearer information, a measurement report, a timing advance measurement report, a carrier aggregation configuration, or an event of the subscription expiring.

In an embodiment, the radio network information is associated with at least one event of the wireless network node, wherein the at least one event comprises at least one of:
the wireless network node detecting a cell change,
the wireless network node detecting at least one of an establishing, a modification or a release of a radio access bearer,
the wireless network node performing a measurement towards the wireless terminal,
the wireless network node performing a timing advance measurement towards the wireless terminal, or
the subscription expiring.

In an embodiment, the radio network information and or the at least one event associated with the radio network information may be indicated in the AF request received from the AF.

In an embodiment, the NEF transmits the radio network information to the AF.

Figure 13:
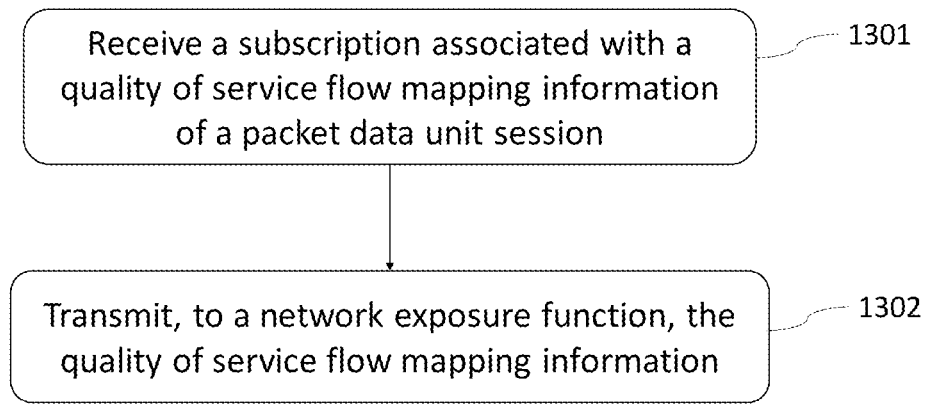
FIG. 13 shows a flowchart of a process according to an embodiment of the present disclosure.

FIG. 13 shows a flowchart of a process according to an embodiment of the present disclosure. The process shown in FIG. 13 may be used in the SMF (e.g. the wireless device or the network entity performing (e.g. comprising) the SMF) and comprises the following steps:

Step 1301: Receive a subscription associated with a quality of service flow mapping information of a packet data unit session.

Step 1302: Transmit, to a network exposure function, the quality of service flow mapping information.

Based on the process shown in FIG. 13, the SMF receives a subscription associated with a QoS flow mapping information of a PDU session. For example, the SMF may receive the subscription according to the process shown in FIGS. 4 and/or 5. Next, the SMF transmits the subscribed QoS flow mapping information to the NEF, e.g., when at least one event associated with the PDU session occurs.

In an embodiment, the QoS flow mapping information comprises mapping information between at least one service flow or at least one QoS flow within the PDU session.

Figure 14:
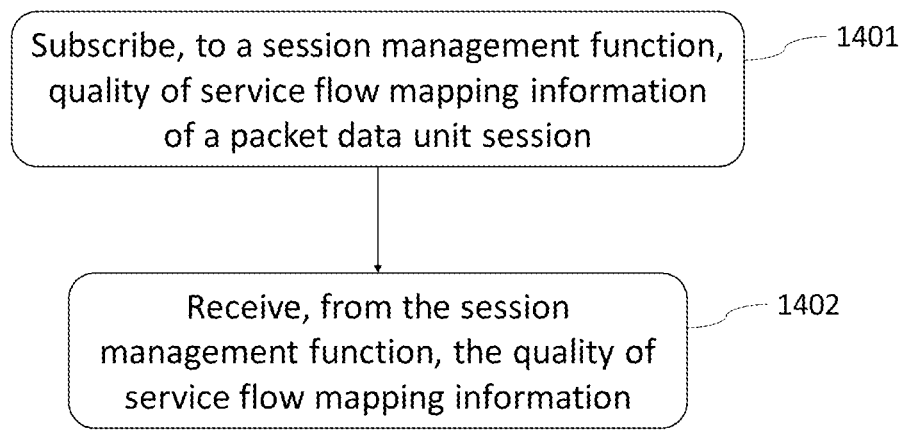
FIG. 14 shows a flowchart of a process according to an embodiment of the present disclosure.

FIG. 14 shows a flowchart of a process according to an embodiment of the present disclosure. The process shown in FIG. 14 may be used in the NEF (e.g. the wireless device or the network entity performing (e.g. comprising) the NEF) and comprises the following steps:

Step 1401: Subscribe, to a session management function, quality of service flow mapping information of a packet data unit session.

Step 1402: Receive, from the session management function, the quality of service flow mapping information.

In FIG. 14, the NEF subscribes QoS flow mapping information of a PDU session to an SMF. For example, the NEF may subscribe the QoS flow mapping information according to the process shown in FIGS. 4 and/or 5. The NEF may receive the QoS flow mapping information from the SMF, e.g., when at least one event associated with the PDU session occurs.

In an embodiment, the QoS flow mapping information comprises mapping information between at least one service flow or at least one QoS flow within the PDU session.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in an access and mobility management function, the wireless communication method comprising:
    receiving a subscription for radio node information associated with a wireless terminal in a wireless network node, and
    transmitting, to a network exposure function, the radio node information associated with the wireless terminal in the wireless network node,
    wherein the radio node information comprises at least one of an address of the wireless network node or a temporary identification of a user equipment context in the wireless network node.

2. The wireless communication method of claim 1, wherein the address of the wireless network node refers to a transport network layer association transport address.

3. The wireless communication method of claim 1, wherein the temporary identification refers to a radio access network node user equipment next generation application protocol identification.

4. The wireless communication method of claim 1, wherein the radio node information is transmitted in at least one of an initial user equipment message, a path switch request message or a handover request acknowledge message.

5. A wireless communication method for use in a network exposure function, the wireless communication method comprising:
    subscribing, to an access and mobility management function, radio node information associated with a wireless terminal in a wireless network node, and
    receiving, from the access and mobility management function, the radio node information associated with the wireless terminal in the wireless network node,
    wherein the radio node information comprises at least one of an address of the wireless network node or a temporary identification of a user equipment context in the wireless network node.

6. The wireless communication method of claim 5, wherein the address of the wireless network node refers to a transport network layer association transport address.

7. The wireless communication method of claim 5, wherein the temporary identification refers to a radio access network node user equipment next generation application protocol identification.

8. The wireless communication method of claim 5, wherein the radio node information is received in at least one of an initial user equipment message, a path switch request message or a handover request acknowledge message.

9. The wireless communication method of claim 5, further comprising:
    establishing a transport network layer association towards the wireless network node based on the radio node information.

10. The wireless communication method of claim 9, further comprising:

transmitting, to the wireless network node, a request for radio network information via the transport network layer association, and receiving, from the wireless network node, the radio network information via the transport network layer association.

11. The wireless communication method of claim 10, wherein the request for the radio network information comprises a temporary identification of a user equipment context in the wireless network node.

12. The wireless communication method of claim 10, wherein the radio network information comprises at least one of cell information, radio access bearer information, a measurement report, a timing advance measurement report, a carrier aggregation configuration or an event of the subscription expiring.

13. The wireless communication method of claim 10, wherein the radio network information is associated with at least one event of the wireless network node, and wherein the at least one event comprises at least one of:

the wireless network node detecting a cell change, the wireless network node detecting at least one of an establishing, a modification or a release of a radio access bearer, the wireless network node performing a measurement towards the wireless terminal, the wireless network node performing a timing advance measurement towards the wireless terminal, or the subscription expiring.

14. The wireless communication method of claim 10, further comprising:

transmitting, to an application function, the radio network information.

15. A wireless device, comprising a processor and a storage unit, wherein the processor is configured to read a program code from the storage unit and implement a method recited in claim 1.

16. A wireless device, comprising a processor and a storage unit, wherein the processor is configured to read a program code from the storage unit and implement a method recited in claim 5.

* * * * *